No. 886,488. PATENTED MAY 5, 1908.
P. J. FINK.
MECHANISM FOR FORMING BEEHIVES.
APPLICATION FILED SEPT. 5, 1907.
2 SHEETS—SHEET 2.
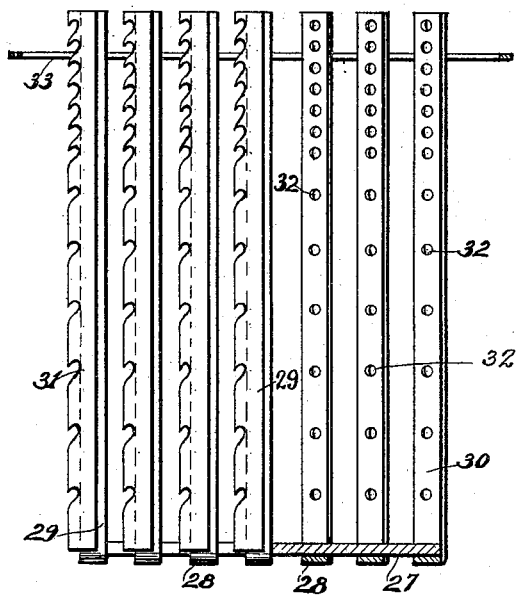
FIG. 7.
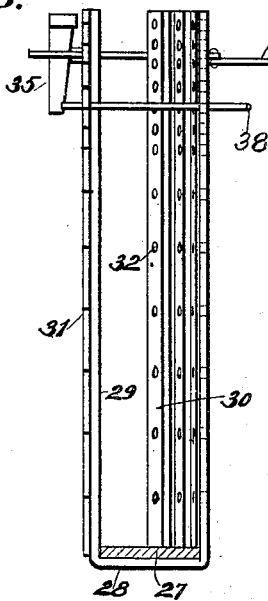
FIG. 8.
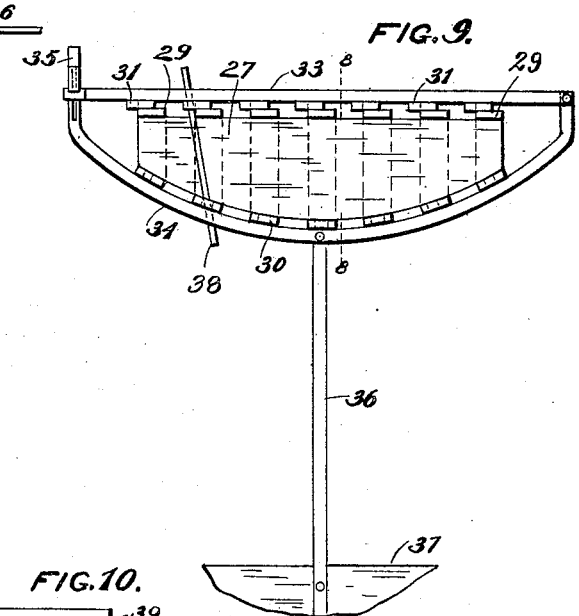
FIG. 9.
FIG. 10.
WITNESSES.
L. W. Theurer.
Anna F. Schmidtbauer.
INVENTOR.
Peter J. Fink
By Benedict, Morsell & Caldwell,
ATTORNEYS.

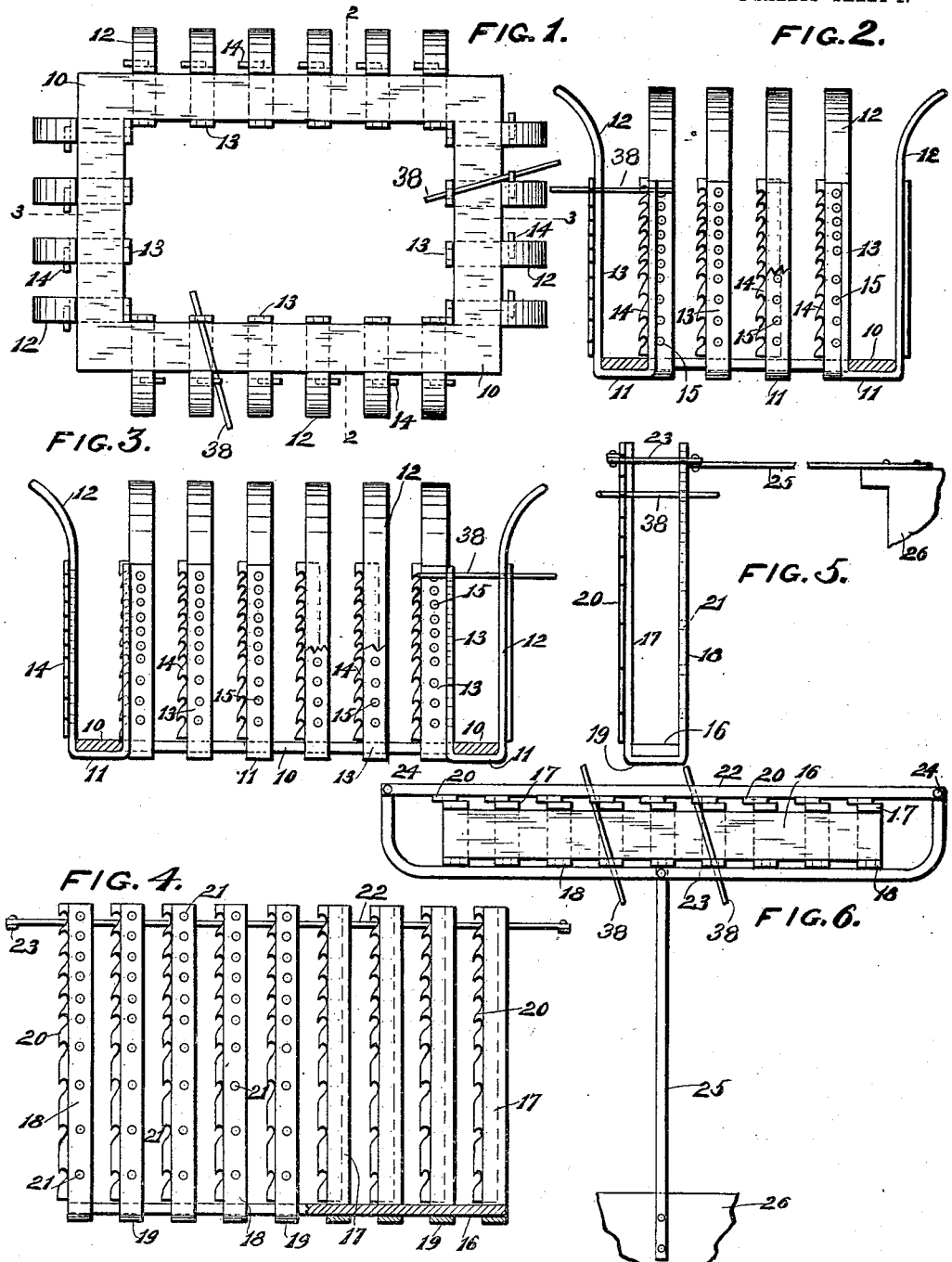

UNITED STATES PATENT OFFICE.

PETER J. FINK, OF OAKFIELD, WISCONSIN.

MECHANISM FOR FORMING BEEHIVES.

No. 886,488.   Specification of Letters Patent.   Patented May 5, 1908.

Application filed September 5, 1907. Serial No. 391,420.

*To all whom it may concern:*

Be it known that I, PETER J. FINK, residing in Oakfield, in the county of Fond du Lac and State of Wisconsin, have invented new and useful Improvements in Mechanism for Forming Beehives, of which the following is a description, reference being had to the accompanying drawings, which are a part of this specification.

My invention has relation to improvements in mechanism for forming bee hives which are to be made up of lengths of material, such as lengths of straw.

The object of the invention is to provide convenient and simple mechanisms for forming the main body portion, the bottom, and the top or cover of bee hives, more particularly of the form shown in my application for patent, for improvements in bee hives, executed of even date herewith, the several frameworks being of such character as to make it possible not only to give the requisite shape to the different parts of the hive, but also to provide for packing the lengths of straw tightly together, and then sewing the lengths together before the formed portions of the hive are removed from the frames.

With the above primary object in view, and other incidental objects, the invention consists of the devices and parts, or the equivalents thereof, as hereinafter more fully set forth.

In the accompanying drawing, Figure 1 is a plan view of the framework for forming a body portion of the bee hive; Fig. 2 is a cross section on the line 2—2 of Fig. 1, part broken away; Fig. 3 is a longitudinal section centrally through Fig. 1, parts broken away; Fig. 4 is a front view of the frame for forming the bottom of the bee hive, one half of the structure being shown in section; Fig. 5 is a left hand end view of Fig. 4; Fig. 6 is a top view of Fig. 4; Fig. 7 is an elevation of the means for forming the top of the bee hive, one half being in section; Fig. 8 is a section on the line 8—8 of Fig. 9; Fig. 9 is a plan view of Fig. 7; and, Fig. 10 is a view of the block for forming the opening or door in the lower portion of the body of the bee hive.

Reference will first be made to the framework or structure by means of which the body of the bee hive is formed, and which frame or structure is shown in Figs. 1, 2 and 3 of the drawings. In these figures, the numeral 10 indicates the base of the frame, consisting of a rectangular open frame set horizontally, comprising the opposite flat side pieces and the opposite flat end pieces. Arranged at desired distances apart along the side and end pieces of this base frame are a series of U-shaped devices, preferably of elastic material, such as spring metal, the lower bend 11 of each device extending beneath the base so that the two arms 12 and 13 of each device extend upwardly, the outer arm 12 extending up higher than the inner arm 13, and the upper end of each outer arm being curved outwardly. Each outer arm has also projecting from one edge a series of downwardly pointing vertically alined teeth 14, preferably formed on a separate strip secured to each outer arm. Each inner arm is provided with a vertical line of apertures 15. It will be observed that the apertures toward the upper ends of these inner arms are arranged closer together than the lower apertures, for the reason hereinafter stated.

The framework for forming the bottom of the bee hive is shown in Figs. 4, 5 and 6 of the drawings. Referring to these figures, the numeral 16 indicates the base board of said frame, 17 and 18 respectively the arms of the U-shaped devices, and 19 the bends of said U-shaped devices, which devices are preferably of elastic material, such as elastic metal. The base 16 of this frame differs from the base of the frame for forming the body of the hive, in that said base 16, for the bottom of the hive merely consists of a straight and flat strip of wood, and not a rectangular open frame, as is the case with the frame 10. The arms 17 extending upwardly from one edge of this straight base board 16 are provided with a series of downwardly pointing teeth 20, the same as the arms 12 in the Figs. 1 and 3 construction, but are not prolonged upwardly and curved outwardly, as are said arms 12. Each arm 18 extending upwardly from the opposite edge of said base board is provided with a vertical line of apertures 21, the apertures near the upper ends of said arms 18 being closer together than the apertures therebelow, the same as in the case of the apertures of the arms 13.

The U-shaped devices forming the arms 17 and 18 are, as stated, of spring material, and their natural tendency is to spring outwardly. In order to overcome this tendency, and to keep said arms in a substantially perpendicular position under normal conditions, I provide a frame consisting of the two members 22 and 23, the latter having its ends bent back and joined to the straight ends of member 22 by means of rivets 24, or equivalent devices. Extending outwardly horizontally, preferably from the center of member 23 is an arm 25, the outer end of said arm being connected to a bench, table, or other suitable support 26.

Sheet 2 of the drawings illustrates the construction for forming the top or cover of the bee hive. This is quite similar to the structure for forming the bottom of the hive, being composed of a flat horizontal base piece 27, and the U-shaped elastic devices, the latter having the lower bends 28 passing beneath the base board, and the upright arms 29 and 30 extending upwardly from opposite edges of the board, the former arms provided with the downwardly pointing teeth 31, and the latter arms with the apertures 32, which apertures are advisably arranged closer together toward the upper ends of said arms. The base board 27, however, in this frame differs in contour from the base board 16, in that one longitudinal edge of board 27 is curved on the arc of a circle, and the arms 30 thereagainst are, therefore, given a similar curvature. Also in this construction there is a frame inclosing the upper ends of the arms 29 and 30, said frame consisting of a straight member 33 and a curved member 34, the curvature of the latter corresponding to the curvature of the curved edge of base 27, and thereby confining the arms 30 between it and said curved edge of the base. The ends of member 34 are bent back, and one of said ends is pivoted to one end of member 33, and the opposite end is adjustably secured to the corresponding end of member 33 by means of a wedge key 35 engaging registering slots in said ends of the two members. By this means, the engagement of the members of the frame with the upper ends of arms 29 and 30 may be regulated so as to adjust the degree of the clamping effect of the frame. The member 34 of the frame is also provided with a projecting arm 36, extending preferably from the center of said member, and having its outer end connected to a bench, table, or other suitable support 37, the same as the arm 25 and support 26 of the Figs. 4 to 6 construction.

In the use of the invention, and first in regard to the formation of the main body portion, the lengths of material, preferably straw, are first passed downwardly between the arms 12 and 13 of the Figs. 1 to 3 form of construction and laid upon the rectangular base 10, and turned around the corners of said rectangular base. After a desired height of these lengths of material is reached a rod 38 is passed through one of the lower apertures 15 of the arms 13, and the inner end of said arm brought down firmly into engagement with the straw lengths, so as to pack said straw lengths firmly against the base 10. When this packing is accomplished, the outer end of the rod 38 is engaged beneath one of the teeth 14, and the rod left remaining in this adjustment for the time being. Another rod similar to 38 is next inserted through one of the lower openings 15 of one of the arms 13 located at such a distance from the first referred to arm 13, as to insure the continuous packing of the material. This rod is manipulated in the same manner, and after the packing is completed the outer end of the rod is engaged beneath a tooth 14 of this arm. This operation is continued around the frame, different rods being passed through the apertures of such arms 13 as may be required, and after the material is packed, being engaged beneath the proper teeth 14 of the arms 12. After the lower layer is packed in this manner, another quantity of the material is placed on top of the lower packed batch, and this next succeeding layer is packed in the same manner, the rods 38 which were employed for such packing being left in engagement, and the lower series of rods withdrawn, to be employed for the third successive layer. This operation is continued until the height of the material reaches the upper ends of the arms 13, and the last series of rods 38 are left in engagement temporarily, so as to hold down the entire packed mass, until the stitching operation is completed. The material preferably used for the stitching is lengths of cane, similar to lengths of cane employed in caning chairs. These lengths of cane are passed back and forth vertically through the lengths of straw in the spaces between the arms of the frame, and when the entire stitching operation is completed, the upper rods 38 are removed.

As set forth in my application for patent for improvements in bee hives, executed of even date herewith, I prefer to construct the body of the hive of two sections, one arranged above the other. Therefore, where this particular and specific form of bee hive body structure is desired it is necessary to repeat the operation just described with reference to the Figs. 1 to 3 construction, in order to form the said two sections. Also, in the form of bee hive illustrated in said application for patent executed of even date herewith the meeting edges of these two sections of the bee hive are provided with interlocking shoulders. These shoulders are formed by hand pressure, the shoulder formation being preserved by properly running the stitch lines. Furthermore, in the form of bee hive illustrated in my said application for patent of even date herewith the lower section of the body of the hive is provided with an opening for the ingress and egress of the bees. This opening is formed by placing a block 39 (see Fig. 10) at a suitable point on the base 10 and between the plurality of the arms 12 and 13, the said block when removed, of course leaving an opening.

The formation of the bottom of the bee hive is secured merely by dropping the lengths of straw between the arms 17 and 18 so that the first layer or batch will rest on the base board 16, and building up by successive layers, each layer being packed by means of the rods 38, the last layer being flush with the upper ends (Fig. 4) of the arms 17 and 18. This packed formation of straw after removal, and in its horizontal position, forms a flat bottom piece. As previously stated, the frame consisting of the members 22 and 23 is preferably employed in connection with the mechanism for forming the bottom of the hive, and this frame is arranged around the upper ends of the arms 17 and 18, and tends to hold said arms in upright vertical position, the tendency of said arms, owing to their elastic nature being to spread outwardly at their upper ends. When, therefore, the operations of packing the straw for the formation of the bottom, and the stitching of straw lengths forming said bottom are completed, and it is desired to remove the completed bottom section, the said frame composed of the two members 22 and 23 is then lifted upwardly out of engagement with the upper ends of arms 17 and 18. Immediately upon this disengagement the arms spread outwardly, and the space is thus widened so as to permit of the ready removal of the completed bottom section. In the Figs. 1 to 3 form of construction in view of the fact that the upper ends of the arms 12 curve outwardly the necessity for the employment of the frame is not so great as in the case of the Figs. 4 to 6 construction, inasmuch as the upper curved ends of arms 12 form a flaring or enlarged mouth through which the formed body section can be conveniently pulled.

In the formation of the top or cover, the lengths of straw are placed upon the base 27, and the different layers packed and built up in exactly the same manner as described with relation to the forms of construction illustrated upon sheet 1 of the drawings, and after the top or cover is fully completed and stitched, all that is necessary to be done is to remove the wedge key 35, and this will permit the separation of two ends of the frame composed of the members 33 and 34, and thus permit the arms 29 and 30 to spread apart in order to provide for ready withdrawal of the completed top or cover. In view of the fact that the arms 30 of the Sheet 2 form of construction are disposed on an arc of a circle the completed top or cover section will necessarily be formed with one side curved. This curved side forms the top or upper face of the cover, and by reason of its curvature is adapted to shed water.

The apertures in the several arms 13, 18 and 30 are arranged closer together toward the upper ends of said arms, in view of the fact that as the height of the straw lengths increases, greater pressure is necessary in order to pack the augmented bulk or mass of straw.

The arms 25 and 36 of the devices for forming the bottom and top or cover respectively, and the outer ends of which arms are secured to benches, tables, or the like 26 and 37, tend to hold the framework in upright position during the operation of forming these parts of the bee hive.

What I claim as my invention is:

1. In a device for making bee hives, the combination with a base piece upon which the lengths of material to form the hive are compacted, of a plurality of arms extending upwardly from opposite side edges of the base piece, every two arms of a set being spaced a distance laterally from the next adjacent two arms, to form a series of spaces into which a tool or implement may be inserted for packing down the lengths of material.

2. In a device for making bee hives, the combination with a base piece upon which the lengths of material to form the hive are compacted, of a plurality of elastic arms extending upwardly from opposite side edges of the base piece, every two arms of a set being spaced a distance laterally from the next adjacent two arms, to form a series of spaces into which a tool or implement may be inserted for packing down the lengths of material.

3. In devices for making bee hives, the combination of a base piece, arms extending upwardly from opposite edges of said base piece, and spaced a desired distance apart laterally, each arm of the series which extends upwardly from one edge of the base piece being provided with a vertical line of apertures, and a rod adapted to be inserted through any one of said apertures.

4. In devices for making bee hives, the combination with a base piece, of arms extending upwardly from opposite edges of said base piece, and spaced a desired distance laterally apart, the arms extending upwardly from one edge being provided with perforations, the perforations of each of said arms being in vertical alinement, and the arms extending upwardly from the opposite edge of the base piece provided with laterally projecting teeth, and a rod adapted to be inserted through any of the apertures and to be engaged under one of the teeth of the opposite arm.

5. In devices for making bee hives, the combination with a base piece, of a series of U-shaped devices, having the bends thereof extending beneath the base piece, and the two arms thereof extending upwardly from opposite edges of the base piece, and spaced a distance apart laterally.

6. The combination with a base piece, of arms extending upwardly from opposite edges of said base piece, and spaced a desired distance apart laterally, the outer arms having their ends curved outwardly.

7. In devices for making bee hives, the combination of a base piece, elastic arms projecting upwardly from opposite edges of said base piece, and spaced a desired distance apart laterally, and an upper frame inclosing the arms, and serving to hold said arms in upright substantially vertical positions, as against the tendency of said arms to spring outwardly.

8. In devices for making bee hives, the combination with a base piece, of elastic arms extending upwardly from oppositd edges of said base piece, and spaced a desired distance apart laterally, a frame inclosing said arms, and adapted to hold said arms in a substantially perpendicular position, as against the tendency of said arms to spring outwardly, an arm secured to and extending from said frame, and a suitable support to which the outer end of the latter arm is connected.

9. In devices for making bee hives, the combination of a rectangular open base, inner and outer arms extending upwardly from opposite side edges and end edges of the base, and spaced a distance apart laterally.

10. The combination with a rectangular open base, of inner and outer arms extending upwardly from opposite side edges and end edges of the base, and spaced a distance apart laterally, one of the series of arms provided with openings, and a rod adapted to be inserted through any one of the series of openings for packing down the lengths of material arranged between the arms.

11. In devices for making bee hives, the combination of a rectangular base piece, inner and outer arms extending upwardly from opposite side edges and end edges of the base, and spaced a distance apart laterally, one of the series of arms provided with openings, and the other and opposite series of arms provided with projecting teeth, and a rod adapted to be inserted through any one of the series of apertures for packing down the lengths of material arranged between the arms, one end of said rod adapted to engage under a projecting tooth.

12. In devices for making bee hives, the combination of a base piece having one of its longitudinal edges curved in the arc of a circle, arms extending upwardly from the longitudinal straight edge of the base piece, and other arms extending upwardly from the longitudinal carved edge of the base piece.

13. In devices for making bee hives, the combination of a base piece, having one of its longitudinal edges curved in the arc of a circle, arms extending upwardly from the straight longitudinal edge of the base piece, arms extending upwardly from the curved edge of the base piece, and a frame engaging the opposite arms, and tending to hold said arms in normal upright position.

14. In devices for making bee hives, the combination of a base piece, arms extending upwardly from opposite edges of said base piece, a frame engaging the arms, and means for adjusting the degree of clamping effect of the frame.

15. In devices for making bee hives, the combination of a base piece having one of its longitudinal edges curved in the arc of a circle, arms extending upwardly from the longitudinal straight edge of the base piece, arms extending upwardly from the longitudinal curved edge of said base piece, and a frame having an adjustable engagement with the oppositely disposed arms.

16. In a device for making bee hives, the combination of a base piece upon which the lengths of material to form the hive are compacted, a plurality of arms extending upwardly from opposite side edges of the base piece, every two arms of a set being spaced a distance laterally from the next adjacent two arms, to form a series of spaces into which a tool or implement may be inserted for packing down the lengths of material, and means for detachably engaging the packing tool with the arms at varying distances vertically of said arms.

17. In a device for making bee hives, the combination of a base piece upon which the lengths of material to form the hive are compacted, a plurality of arms extending upwardly from opposite side edges of the base piece, every two arms of a set being spaced a distance laterally from the next adjacent two arms, to form a series of spaces into which a tool or implement may be inserted for packing down the lengths of material, and means for detachably engaging the packing tool with the two arms of any set at varying distances vertically of said arms.

In testimony whereof, I affix my signature, in presence of two witnesses.

PETER J. FINK.

Witnesses:
R. S. C. CALDWELL,
ANNA F. SCHMIDTBAUER.